United States Patent [19]

Pope

[11] 4,015,695

[45] Apr. 5, 1977

[54] ANTI-SKID CONTROL SYSTEM

[76] Inventor: Kenneth Elvin Pope, Box 39-A Rte. 3, Wagoner, Okla. 74467

[22] Filed: Mar. 29, 1976

[21] Appl. No.: 671,089

[52] U.S. Cl. .......................... 188/181 A; 200/61.46
[51] Int. Cl.² .......................................... B60T 8/093
[58] Field of Search .................. 188/181 A, 181 R; 200/61.46

[56] References Cited

UNITED STATES PATENTS

| | | | |
|---|---|---|---|
| 2,964,048 | 12/1960 | Mortimer | 188/181 A X |
| 3,379,288 | 4/1968 | Davis | 188/181 A X |
| 3,433,535 | 3/1969 | Horvath | 188/181 A X |
| 3,523,712 | 8/1970 | Leiber | 188/181 A X |

*Primary Examiner*—Duane A. Reger
*Attorney, Agent, or Firm*—Ralph E. Zimmerman

[57] ABSTRACT

A device for controlling skidding on roadway surfaces comprising anti-skid control means for regulating and controlling the braking system of the said vehicles; the said device being automatically responsive to changes in the drag in the said braking system; the said device comprising a first rotatable speed detector wheel mounted on a shaft with at least one permanent magnet embedded therein in the said first wheel, the said first wheel being in combination with a second rotatable wheel which is movably mounted on the said shaft the said second wheel having at least one cam follower for actuating the in and out movement of a coaxial switch plate which is electrically connected to and actuates a release valve in a pneumatic pressure chamber to release the brake chamber pressure therein, the said device being such that it controls the brake chamber pressure so that optimum lineal deceleration is maintained proportionally to the angular deceleration of the wheels respectively and maximum braking traction is maintained without the skidding of the vehicle wheels.

7 Claims, 7 Drawing Figures

ANTI-SKID CONTROL SYSTEM

BACKGROUND OF THE INVENTION

The problem of Anti-skidding systems for motor vehicles is disclosed in the publication No. 730698 by the Society of Automotive Engineers, Inc. published at 2 Pennsylvania Plaza, New York, N.Y. 10001, as presented by the West coast meeting, Portland, Ore., Aug. 20–23, 1973 and required by National Highway Traffic Safety Administration in specification Number MVSS-121.

This publication outlines the problems and needs for anti-skid systems which can be applied to the trucking industry. It also relates that there is a great need for such equipment in the industry.

This invention shall disclose a device which when installed in connection with a braking system shall furnish means to control the braking of vehicles when brakes are applied so as to avoid difficulty due to skidding conditions on hazardous surfaces.

Skidding conditions are due to the changing conditions of the interface between the pneumatic tire and the pavement upon which the vehicle is travelling. The use of my invention should produce safer braking of the said vehicle under all changing conditions of the road surface and to avoid skidding of the wheels of the vehicle when braking which results in the contingent loss of steering control.

SUMMARY OF THE INVENTION

This invention comprises a device for controlling the disproportionate rate of the angular deceleration of vehicle wheels in linear motion over a road surface. The interface friction between the pneumatic tires and the road surface will vary depending on the road conditions, brake condition, axle loading and the tire thread condition.

The over application of vehicle braking without braking control may cause the vehicle to skid. The anti-skid system which is described herein comprises a hermetically sealed housing with two mounting shafts axially aligned in assembly. The assembly consists of a first rotating wheel with magnets embedded therein which is rotatably mounted on a first hollow shaft perpendicularly attached to one end of the housing. The motion of the first rotating wheel with magnets embedded therein is about the center line of the first hollow shaft and rotates in a circular path parallel to the direction of the motion of the wheeled vehicle. The speed of rotation of the wheel with the embedded magnets is controlled by the speed of a magnet mounted in a moving vehicle wheel. A second rotating inertia damped wheel which is rotatably mounted on the first hollow shaft and which is supported by at least one set of ball bearings fixably mounted on the first hollow shaft, is driven by the first rotatable wheel through a spring loaded unidirectional drive dog or clutch mounted on the first rotating wheel. Assembled in the housing and moving in a circular path around the first shaft is at least one cam follower which moves in a circular parallel path around the first shaft as the first and second wheel moves in a circular path around the first shaft. The cam follower is carried by the second inertia damped rotatable wheel which moves in a clockwise or counterclockwise direction depending upon which side of the vehicle the anti-skid control device is mounted. The cam follower which is spring loaded, moves in a slotted section in the interface of the second wheel and moves off the cam surface of the first wheel in the slot of the second wheel so that the relative rotating speed of the first and second wheel will correspondingly control the bilateral movement of the cam follower. The movement of the cam follower controls the in and out movement of a coaxial switch plate when the first wheel falls behind the second wheel in rotational displacement. Also assembled in the anti-skid control device is a pendulous mass which is pivotly mounted on a second shaft. The pendulous mass which can be described as a deceleration sensing and damping mass contains permanent magnets with opposite poles mounted along a radial section of the deceleration sensing and damping mass. This pendulous mass which is mounted on a second shaft swings in a pendulous path around the second shaft. The maximum traction system is motivated by the movement of at least one permanent magnet mounted on a vehicle wheel in motion in a circular path around the shaft of the vehicle axle and is coupled with the magnets embedded in the first rotating wheel or in the alternative the first wheel can be driven by a flexible cable assembly, one end of the cable being connected by gear means through the housing wall to the first said wheel while the other end of the flexible cable is driven by gear means at the vehicle wheel. The flexible cable assembly drives the first wheel in the same rotational direction as that of the vehicle wheel direction and a spring loaded drive dog moves the second rotational wheel. The vehicle deceleration itself causes the pendulous sensing and damping mass to move in a pendulous path.

OBJECTS OF THE INVENTION

The main object of this invention is to furnish traction control for vehicles to avoid skidding of the wheels of the vehicle by controlling the braking system on the said vehicle.

The general object of this invention is to disclose an Anti-skid control system including an anti-skid control device which relies for its operation on the movement of at least one magnet in a rotating wheel.

An additional object of this invention is to provide an anti-skid system which relies on the movement of rotation sensing components in an enclosure to control the skidding of of a vehicle by regulating the control valve in a pneumatic brake system.

Still another object of this invention is to show various means of regulating a control valve in the pneumatic brake system in connection with the use of the anti-skid control device disclosed herein.

DESCRIPTION OF THE PREFERRED EMBODIMENT

Figure 1:
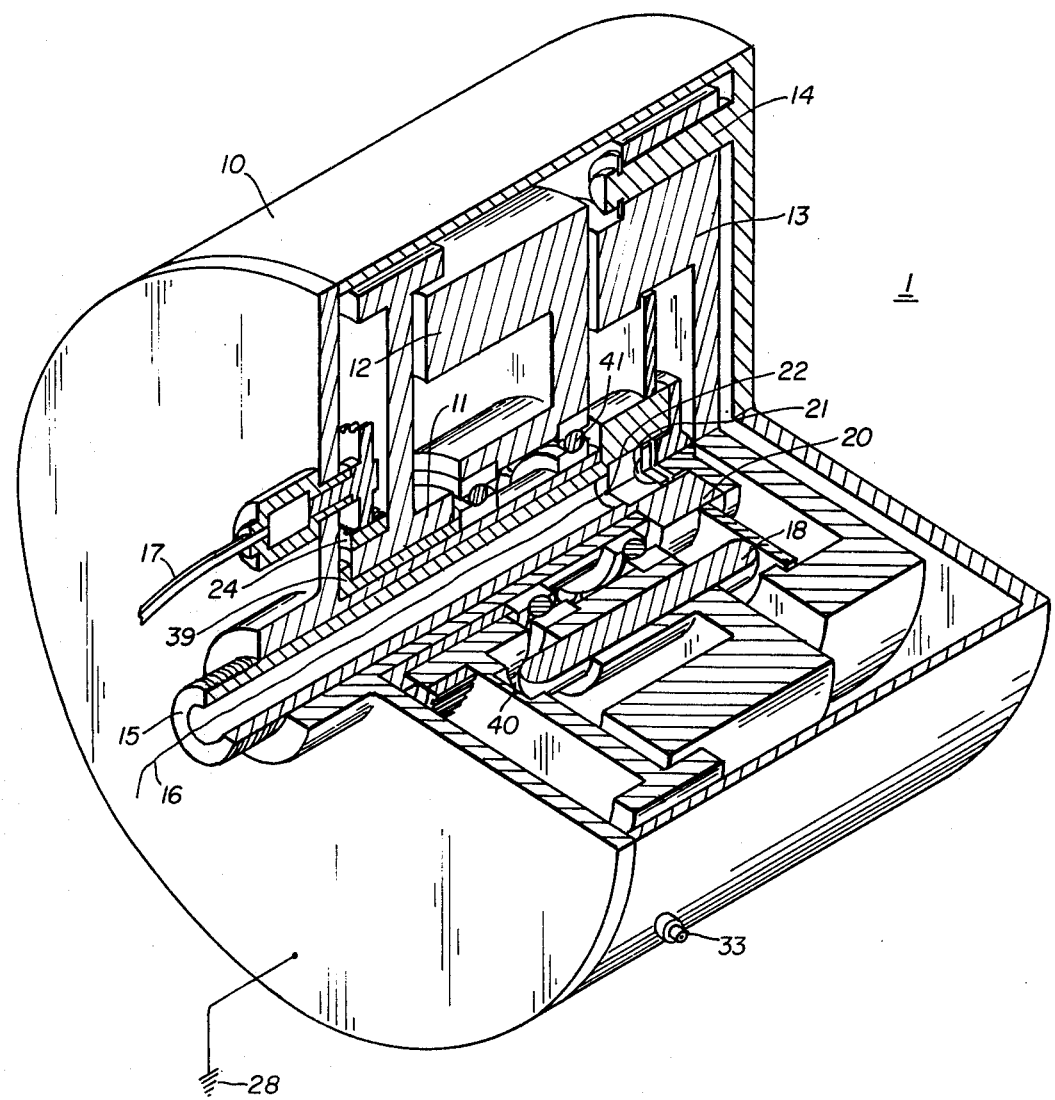
FIG. 1 is an isometrical crossectional front view of the anti-skid controlling system showing the internal composite components within the housing which control the operation of the anti-skid system.
Figure 3:
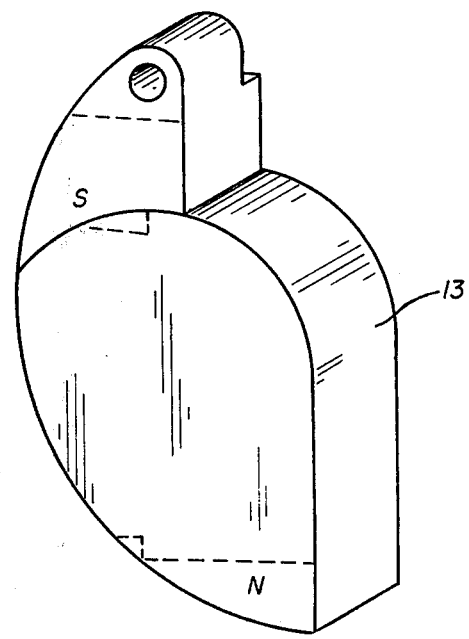
FIG. 3 is a front view showing the physical contour of the deceleration sensing and damping mass which is part of the internal structure as shown in FIG. 1.
Figure 4:
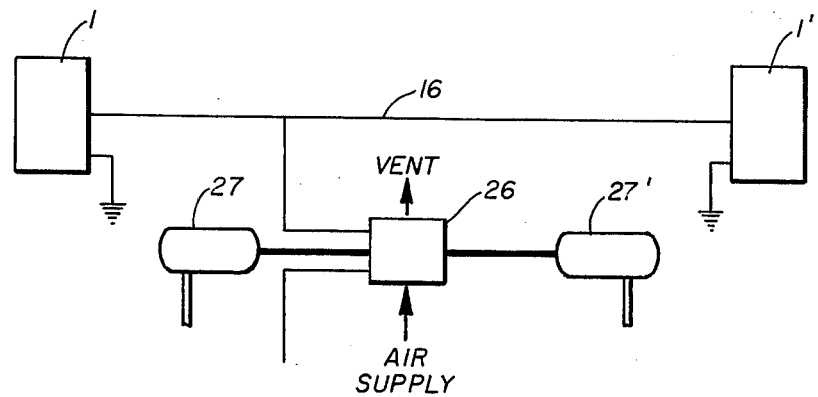
FIG. 4 is a schematic sketch of the anti-skid control assembly incorporating a solenoid control valve.

FIG. 1 shows an isometrical crossectional front view showing the anti-skid control device. The control device 1 is hermetically sealed by encasement 10. Extending from one end of the encasement 10 is shown a stationary hollow shaft 15 upon which is movably mounted on sleeve bearing 39, a rotatable speed detector wheel 11 with permanent magnets embedded therein and a rim gear 24 mounted thereto which can be actuated by flexible cable assembly 17 which includes a cable with a first and second gear (not shown) mounted on each end. Rotatable speed detector wheel 11 is mounted on sleeve bearing 39 to assume freedom in movement. Aligned next to rotatable speed detector wheel 11 is the second rotatable wheel 12 which is movably mounted on ball bearing 41 on hollow shaft 15. Attached to the end of shaft 15 is the switch plate assembly 20 which make up a coaxial switch comprising contact switch buttons 21 and 22 which are located in the switch plate assembly 20. The coaxial switch plate in switch plate assembly 20 is actuated by at least one cam follower 18 resting against a cam surface 40 located in the side of rotatable speed detector wheel 11. An electrical wire from button 21 passes through shaft 15 to the air control valve 26 as shown in FIG. 4. Assembled on shaft 14 and hanging as a pendulous mass is the deceleration sensing and damping mass 13 with alternate magnetic north and south poles, (see FIG. 3). The magnetic north and south poles shown in FIG. 3 are necessary for proper operation of the anti-skid control device. The controlling assembly is grounded at 28, (see FIG. 1.).

Figure 2:
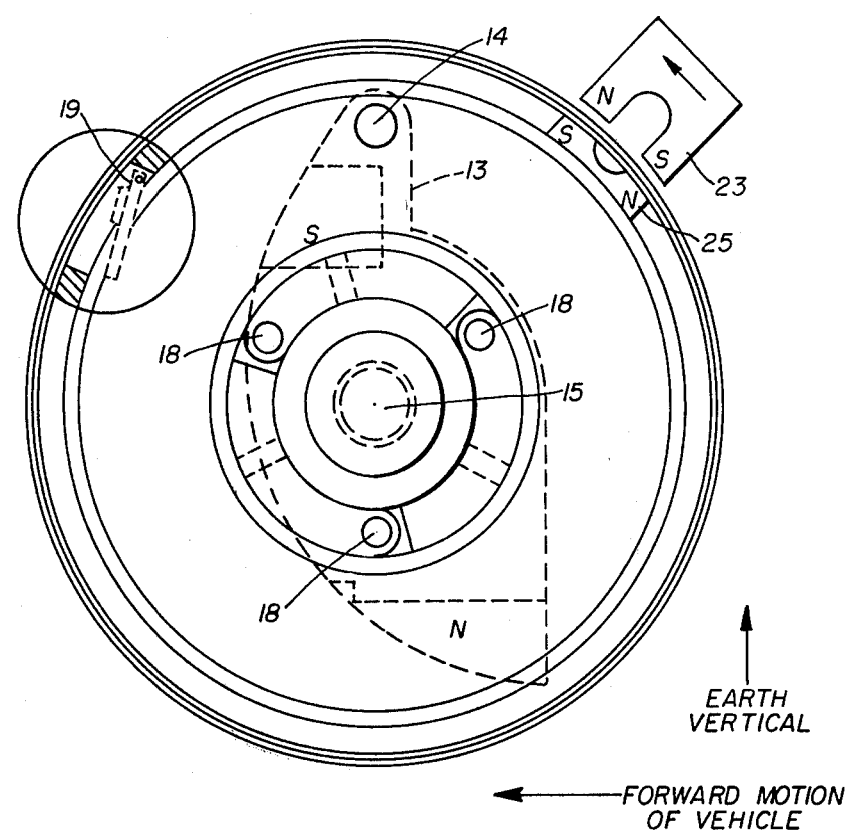
FIG. 2 is a crossectional end view of the anti-skid control system showing the assembly mounted in the hub of a dead axle and includes the deceleration sensing damping body mass and its support shaft in relation to earth gravity, the magnetic coupler and the one way spring loaded drive dog.

Embodiments of this invention will form an anti-skid system of low cost and maintenance with freedom from failure of electronic components which are presently used in known anti-skid systems. FIG. 2 shows at least one magnet 23 which is installed in the wheel of the moving vehicle. Magnet 23 forms a magnetic coupling with magnets 25 embedded in the speed detector wheel 11, FIG. 1, which is rotatably mounted on shaft as shown in 15, FIG. 1. Because of the magnetic coupling of magnet 23 and the magnets 25 in speed detector wheel 11, FIG. 1 the movement of magnet 23 in a circular path will move wheel speed detector wheel 11, FIG. 1 counterclockwise or clockwise, depending on which side of the vehicle the unit is mounted, about the shaft 15 proportionally to the lineal velocity of the vehicle wheel. At constant speed, rotatably speed detector wheel 11 and rotatable second wheel 12 which is aligned on hollow shaft 15 adjacent to the speed detector wheel 11 both move in a circular path with the same torsional moment about shaft 15. Both the speed detector wheel 11 and the second wheel 12 rotate at the same speed under normal operating conditions. One way drive dog 19, FIG. 2 act as a unidirectional clutch which is spring loaded and moves in direction toward the shaft 15 is attached to the side of speed detector wheel 11. Drive dog 19 drives the second wheel 12 at the same speed as the speed detector wheel 11 under normal operating conditions i.e. where no deceleration of the vehicle wheel (not shown) is present.

When the anti-skid control device 1 FIG. 1 is mounted on the right side of the vehicle, upon brake application which results in deceleration of the vehicle, deceleration sensing and damping mass 13, FIG. 1 moves clockwise about shaft 14 to a position which is determined by the magnitude of the deceleration and the counter balancing component of earth gravity, which at 1.g deceleration would be 45° to the vertical providing no other forces are acting upon the deceleration sensing and damping mass 13, FIG. 1. Deceleration sensing and damping mass 12, FIG. 1 has on its surface face mounted toward wheel 12, FIG. 1 at least one N-S pole of permanent magnetism. Wheel 12, FIG. 1 which can be either metallic or plastic can be either totally or surface coated with a hysteresis magnetic material such as aluminum, cobalt alloys or any other material exhibiting the proper magnetic characteristics. Due to the magnetic structure of both the second wheel and the deceleration sensing and damping mass there will be a damping torque generated between the second wheel 12, FIG. 1 and the deceleration sensing and damping mass 13, FIG. 1.

The amount of torque developed is determined in accordance with the equation $$T = KRB^2 AV$$

where
$T =$ The damping torque acting to slow the second rotating wheel expressed in dynes/centimeters squared.
$K =$ Design constant.
$R =$ Radius of action of the magnetic pole or poles in the deceleration sensing and damping mass 13 expressed in centimeters.
$B =$ Flux density of magnetic field within the air gap between wheel 12, FIG. 1 and the deceleration sensing and damping mass 13, FIG. 1 expressed in gauss.
$A =$ Area of hysteresis material in wheel 12, FIG. 2 within the magnetic field of the deceleration on sensing and damping mass 13, FIG. 1 expressed in centimeters squared.
$V =$ The relative velocity between the wheel 12 and the deceleration sensing and damping mass 13, FIG. 1.

As the magnitude of the vehicle deceleration changes, the radius of action of the magnetic pole in the deceleration sensing and damping mass 13, FIG. 1 changes as does the area of hysteresis material within the magnetic field so that the resultant torque applied to damp the rotation of the second wheel 12, FIG. 1 renders the proper $\alpha$ in the equation $$T = \alpha I$$

where
$T =$ the hysteresis effect damping torque.
$\alpha =$ Angular deceleration of the second wheel 12, FIG. 1.
$I =$ Rotational inertia of the second wheel 12, FIG. 1. Damping the second wheel 12, FIG. 1 as if it were an unbraked wheel will give a rotational representation of real vehicle velocity over the pavement. As long as the braking applied to the vehicle wheel does not tend to slow the rotational velocity of the vehicle wheel in excess of the second wheel 12, FIG. 1 no traction control is required. However, if wheel speed detector (first wheel) 11, FIG. 1 slows faster than second wheel 12, FIG. 1 indicating overbraking and an impending skid condition, the cam surface 40, FIG. 1 in the face of first wheel 11, FIG. 1 facing toward the cam follower 18, FIG. 1 which is carried by second wheel 12, FIG. 1 causes cam follower 18, FIG. 1 to move in a direction so as to actuate switch plate assembly 20, FIG. 1 which in turn brings button 21 and 22, FIG. 1 in contact completing the electrical circuit 16, FIG. 4 to the brake chamber pressure control valve 26, FIG. 4. This decreases the braking pressure applied by releasing the air pressure and preventing the vehicle wheel from skidding. Thus controlling the slip condition determined by the cam surface 40 FIG. 1 on the face of wheel 11, FIG. 1 relays to the cam follower 18, FIG. 1 the angular relationship of item 12 and 11 FIG. 1 during the stopping distance of the vehicle.

As taught in U.S. Pat. No. 2,861,789 issued 11-25-58 to Kenneth E. Pope, an inertia wheel acting upon by a torque proportional to acceleration will if started from a reference condition in its future $\omega$ (rotational velocity) and $\theta$ (rotational displacement) the respective changes in velocity and displacement caused to a vehicle by that acceleration acting from $t_0$ (Time 0) to $t_1$ (time one second) to $t_s$ (time stop). In this case it is deceleration acting to bring a vehicle traveling at $V_1$ (original reference velocity of the vehicle wheel) to the shortest distance stop which the traction conditions of the wheel road interface will permit without skidding the wheel. This is done by controlling 14% to 25% less than true vehicle velocity over pavement. This for pneumatic tired vehicles is the maximum traction coefficient attainable.

Another feature of this device is that the deceleration and damping mass 13, FIG. 1, also locks switch plate assembly 20, FIG. 1, open when deceleration of the vehicle wheel is less than 0.25 g to allow the vehicle to backup without venting its brakes. Otherwise without this feature would result in losing brake action in reverse.

Reference is made to FIG. 3 which shows the pendulous deceleration sensing and damping mass 13. The deceleration and damping mass 13, FIG. 3, is structured with a north and south pole magnet positioned at opposite ends of the structure. The entire structure is rotatably mounted on shaft 14, FIG. 1, and swings in a pendulous path to a position as the vehicle moves in a forward direction at constant speed.

The pendulous deceleration sensing and damping mass 13, FIG. 1, is spaced at a selected distance or air space gap from the second rotatable wheel 12, FIG. 1, which is a hysteresis damped integrator wheel and this rotatable wheel 12, FIG. 1, is damped by the magnetic flux existing in the air space gap between the pendulous deceleration sensing and damping mass 13, FIG. 1, and rotatable wheel 12, FIG. 1.

The deceleration sensing and damping mass 13, FIG. 1, also inhibits the action of switch position plate 20, FIG. 1, when the deceleration rate of the vehicle wheel is less than 0.25 g.

While in accordance with the Patent Statutes only the best known embodiment of the invention has been illustrated and described in detail it is to be particularly understood that the invention is not limited thereto or thereby, but that the inventive scope is identified in the appended claims.

What is claimed is:

1. In an anti-skid control system for controlling the disproportionate rate between the angular deceleration of a vehicle wheel and the lineal deceleration of a moving vehicle over a surface, the combination comprising a rigid outer housing, the said housing enclosing a hollow support shaft suitable for mounting a first rotatable wheel, the said first wheel by means of an unidirectional clutch driving a controlled inertia damped second wheel, the said controlled inertia damped second wheel having in its interface a slot to accomodate at least one cam follower supported within the second wheel in a manner so as to be free to move axially to actuate a coaxial switch mounted on the end of the said hollow shaft, the said coaxial switch having means to actuate an air control valve.

2. In an anti-skid control system, as claimed in claim 1, for controlling the disproportionate rate between the angular deceleration of a vehicle wheel and the lineal deceleration of a moving vehicle over a surface, the combination comprising:

a magnet mounted in a moving vehicle wheel in combination with a first magnetically treated rotatable wheel so as to form a magnetic coupler between the said wheel mounted magnet in the said vehicle wheel and the first magnetically treated rotatable wheel, the said first wheel being rotatable mounted in a housing, the said housing having a circular outer shell and a first and second end plate enclosing a chamber, a first stationary hollow shaft mounted on the said first end plate, the said first shaft extending into the said chamber to furnish support means for the said first rotatable mounted wheel, a second rotatably mounted wheel mounted adjacent to the first said wheel, the said second wheel being driven by the first said wheel through a unidirectional clutch driver; at least one cam follower, the said cam follower being located in a slot, the said slot being located in the interface of the said second rotatable wheel, the said slot being axially aligned with the first said hollow shaft, the cam follower moving in a bilateral direction to actuate the said switch mounted coaxially with and on the end of the said first hollow shaft, the said coaxial switch having two contacts, one of the said contacts having attached to it an insulated electrical wire, the said insulated electrical wire passing through the said hollow shaft to actuate a pilot controlled air control valve, a pendulous deceleration and damping mass pivotly mounted on a second shaft, the said second shaft being attached to the inner wall of the said second end plate, and axially aligned with the first said hollow shaft; a switch position plate with surfaces that engage the said pendulous deceleration sensing and magnetic damping mass.

3. The anti-skid control system as claimed in claim 2 wherein a flexible cable with a first and second gear is fixably attached to the first and second ends of the said flexible cable, the said flexible cable passing through the said first end plate of the said anti-skid control device to connect to the said first gear to give rotation to a said first wheel in the said housing, the said first gear on the said first end of the said flexible cable being in position to rotate a rim gear mounted on the periphery of the first said wheel, and the said second gear being mounted with rotating means on a moving vehicle wheel to transfer the rotation of the said moving vehicle wheel to the said first wheel in the said anti-skid control device.

4. The anti-skid control system as claimed in claim 1, wherein the said hollow first shaft has pneumatic means therein, the said pneumatic means actuating a pilot controlled release air valve, the said pneumatic means being controlled by the movement of a circular sliding valve plate mounted on the end of the said hollow support shaft, the said valve plate being actuated by the movement of the said cam follower.

5. The anti-skid control system as claimed in claim 4 wherein the said hollow first shaft has an annular space therein for the passage of air to at least two release air ports located in the end surface of the said first hollow shaft, the said circular sliding valve plate being positioned to slide over and release the said air through the air ports.

6. The anti-skid control system as claimed in claim 1 where the said hollow shaft has a mechanical push rod mounted therein, the said mechanical push rod having axial movement in the said shaft, the said mechanical push rod being controlled by the movement of a plate attached to the said cam follower, the said mechanical push rod being connected by linkage to an air release valve.

7. The anti-skid control system as claimed in claim 5 wherein the said plate attached to the said cam follower is held in position by at least two springs, the said springs being mounted approximately perpendicular to the surface of the said pendulous deceleration and damping mass.

* * * * *

UNITED STATES PATENT OFFICE
CERTIFICATE OF CORRECTION

Patent No. 4,015,695    Dated April 5, 1977

Inventor(s) Kenneth Elvin Pope

It is certified that error appears in the above-identified patent and that said Letters Patent are hereby corrected as shown below:

Column 5, after line 52, insert:

-- Reference is made to Figure 4 which shows an electrical schematic drawing showing the electrical connections 16, Figure 4 from the left and right wheel speed controlling assembly 1 and 1' grounded to the vehicle frame and connected to solenoid air control valve 26. The solenoid air control valve 26 which is also equipped with air vent means regulates the air supply to the air brake actuator chamber 27 which in turn controls the operation of the air brake shoes (not shown).

Figure 5:
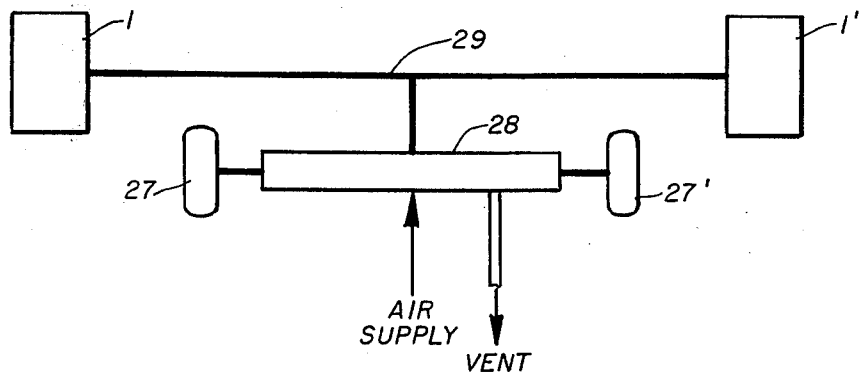
FIG. 5 is a schematic sketch of the anti-skid control assembly incorporating a pilot control valve.
Figure 6:
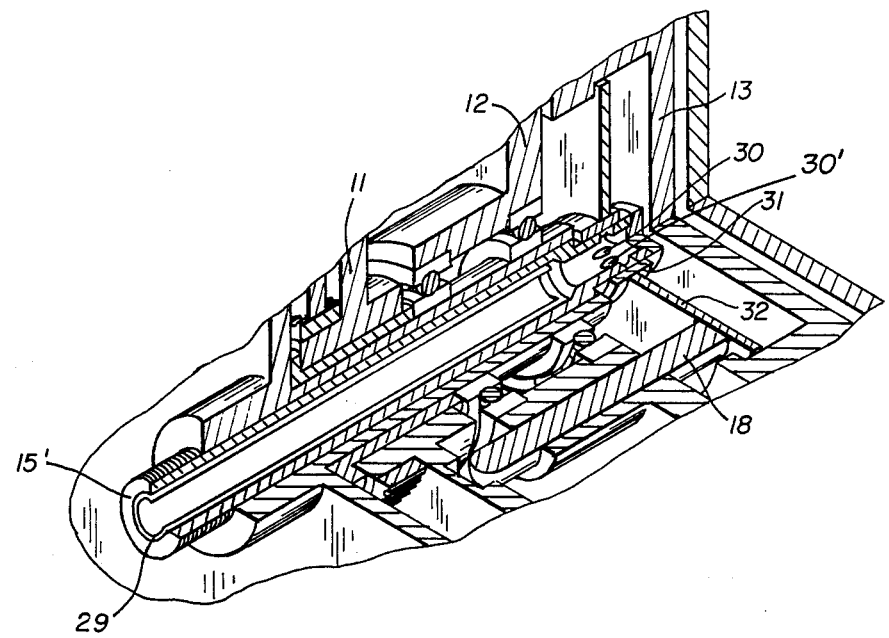
FIG. 6 is a fragmentary isometrical view of the anti-skid controlling assembly showing a circular air vent line through the hollow shaft of the controlling assembly.

Reference is made to Figure 5 which shows a schematic drawing using pneumatic control in the anti-skid control device as shown in Figure 6. The pneumatic line runs from both the right and left wheel speed controlling assembly 1 and 1' through a high pressure line 29 to a pilot control air valve 28 which has a high pressure air supply to it. Pilot control air valve 28 is vented and is pneumatically connected to air actuating chambers 27 and 27' which in turn operates the air brake (not shown).

UNITED STATES PATENT OFFICE
CERTIFICATE OF CORRECTION

Patent No. 4,015,695          Dated April 5, 1977

Inventor(s) Kenneth Elvin Pope

It is certified that error appears in the above-identified patent and that said Letters Patent are hereby corrected as shown below:

Reference is made to Figure 6 which shows the modification necessary to the assembly structure shown in Figure 1 so that pneumatic means can be adapted into the system to replace the electrical means of control as shown in Figure 1 and 4. In this particular application the first shaft shown in Figure 1 is modified to include air passage means 29, Figure 6 which is connected to the pilot controlled air valve 28 as shown in Figure 5. The air passage means 29 as shown in Figure 6 includes two air ports 30 and 30', with sliding valve 31 which also acts as sliding and radial bearings for support of the valve plate 32. The sliding valve 31 is actuated by movement of at least one cam follower 18 as shown in Figure 1 which actuates the sliding valve 31 so as to open and close air ports 30 and 30'. The normal position of valve 31 is closed but when deceleration occurs in the vehicle wheel (not shown) indicating a skidding condition, sliding valve 31 then moves and releases the air pressure from the shaft 1', Figure 6, into the encasement 10, Figure 1. In

UNITED STATES PATENT OFFICE
CERTIFICATE OF CORRECTION

Patent No. 4,015,695                     Dated April 5, 1977

Inventor(s) Kenneth Elvin Pope

It is certified that error appears in the above-identified patent and that said Letters Patent are hereby corrected as shown below:

addition, the encasement 10 has a spring loaded gasket flap valve 33, Figure 1, mounted on the outside of the encasement 10, Figure 1, to release any pressure build up within the encasement 10, Figure 1, during the operation of the system.

Figure 7:
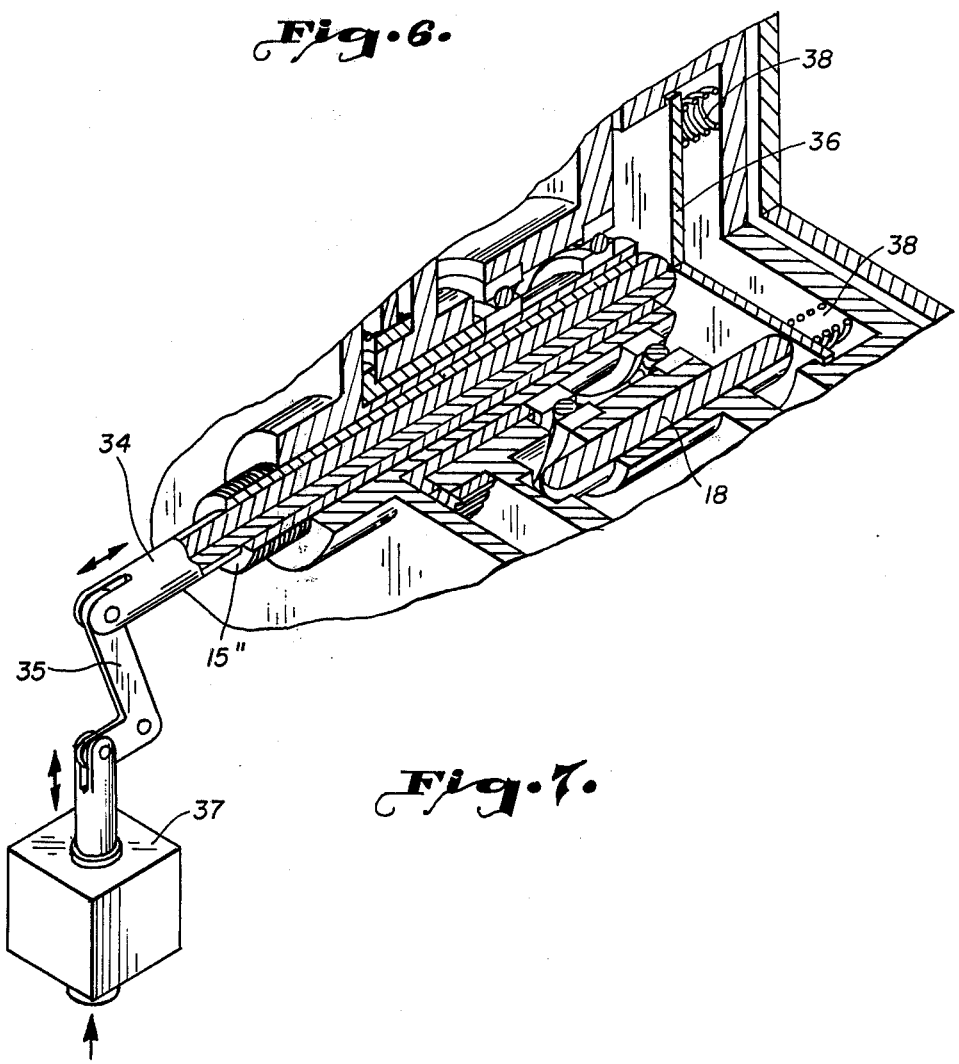
FIG. 7 is a fragmentary isometrical view of the anti-skid controlling assembly showing a mechanical rod with appropriate linkage to an air control valve.

Figure 7 shows a mechanical push rod assembled in the housing 10 shown in Figure 1. The mechanical push rod 34 is connected to linkage 35 as shown which mechanically controls the operation of the air valve 37. The mechanical rod 34 is movably mounted in the shaft 15" and is actuated by the movement of plate 36. Plate 36 is actuated by at least one cam follower 18 and spring 38. The first wheel 11, the second wheel 12 and the deceleration and damping mass 13 all /shown in Figure 1 in the encasement 10 operate in the manner as previously described under Figure 1. The mechanical rod must be lightly loaded; the maximum loading being 25 gram.'—

Signed and Sealed this twenty-sixth Day of July 1977

[SEAL]

Attest:

RUTH C. MASON
*Attesting Officer*

C. MARSHALL DANN
*Commissioner of Patents and Trademarks*